United States Patent [19]

Henry et al.

[11] Patent Number: 5,475,596
[45] Date of Patent: Dec. 12, 1995

[54] FULL CAR SEMI-ACTIVE SUSPENSION CONTROL BASED ON QUARTER CAR CONTROL

[75] Inventors: Rassem R. Henry, Mt. Clemens; Michael A. Applebee, Warren; Balarama V. Murty, Sterling Heights, all of Mich.

[73] Assignee: General Motors Corporation, Detroit, Mich.

[21] Appl. No.: 702,874

[22] Filed: May 20, 1991

[51] Int. Cl.[6] .................................................. B60G 25/00
[52] U.S. Cl. ........................... 364/424.05; 364/426.01; 364/424.01; 280/707; 280/840; 280/703; 280/689; 303/15; 303/22.1
[58] Field of Search ...................... 364/424.05, 424.01, 364/424.02; 280/707, 711, 840, 709, 689, 703, 6.12, 705; 303/15, 22.1, 9.62; 180/9.1, 9.52, 22, 41

[56] References Cited

U.S. PATENT DOCUMENTS

| | | | |
|---|---|---|---|
| 2,850,290 | 9/1958 | Borgmann | 280/112 |
| 3,278,197 | 10/1966 | Gerin | 280/124 |
| 3,858,902 | 1/1975 | Howells et al. | 280/124 R |
| 3,941,402 | 3/1976 | Yankowski et al. | 280/124 R |
| 4,468,050 | 8/1984 | Woods et al. | 280/707 |
| 4,468,739 | 8/1984 | Woods et al. | 364/424 |
| 4,544,868 | 10/1985 | Murty | 318/254 |
| 4,579,366 | 4/1986 | Doi et al. | 280/707 |
| 4,606,440 | 8/1986 | Buchanan, Jr. et al. | 188/319 |
| 4,634,142 | 1/1987 | Woods et al. | 280/707 |
| 4,696,489 | 9/1987 | Fujishiro et al. | 280/707 |
| 4,722,548 | 2/1988 | Hamilton et al. | 280/707 |
| 4,770,438 | 9/1988 | Sugasawa et al. | 280/707 |
| 4,815,575 | 3/1989 | Murty | 188/299 |
| 4,826,206 | 5/1989 | Immega | 280/711 |
| 4,844,506 | 7/1989 | Moriguchi et al. | 280/689 |
| 4,902,034 | 2/1990 | Maguran et al. | 280/707 |
| 4,907,154 | 3/1990 | Yasuda et al. | 364/424.05 |
| 4,909,534 | 3/1990 | Fukushima et al. | 280/707 |
| 4,924,392 | 5/1990 | Kurosawa | 364/424.05 |
| 4,937,748 | 6/1990 | Yonekawa et al. | 364/424.05 |
| 4,977,506 | 12/1990 | Hara et al. | 364/424.05 |

(List continued on next page.)

FOREIGN PATENT DOCUMENTS 0363158  11/1990  European Pat. Off. .

OTHER PUBLICATIONS

Nonlinear Observers—A state-of-the art survey Misawa, E. A. and J. K. Hedrick Sep. 1989.
"Properties of Min–Max controllers in Uncertainty Dynamical Systems" Gutman, S. and Z. Palmor Nov. 1982.
Karnopp, D. Crosby, M., Harwood, R., Vibration Control Using Semi–Active Force Generators, ASME.
Sunwoo, M., Cheok, K., An Application of Explicit Self–Tuning Controller to Vehicle Active Suspension Systems, Twnety–ninth IEEE Conference on Decision in Control, Hawaii, Dec. 1990.
Ogata, K., Modern Control Engineering, Prentice–Hall, Inc., NJ 1970, Chapters 14–15.
Majeed, K., Active Vibration Isolation of Truck Cabs, 1984 American Control Conference, Sand Diego, Calif., Jun. 6–8, 1984.
Majeed, K., Dual Processor Automotive Controller, Proceedings of the IEEE/Application of Automotive Electronics, Dearborn, Mich., Oct. 19, 1988.

*Primary Examiner*—Kevin J. Teska
*Assistant Examiner*—Jacques H. Louis-Jacques
*Attorney, Agent, or Firm*—Anthony Luke Simon

[57] ABSTRACT

A method of control for a vehicle suspension system comprising four quarter car suspensions and a suspended vehicle body, comprising the steps of developing a quarter car command for each quarter car suspension in response to a signal representative of that quarter car state, developing a semi-rigid body command in response to a signal representative of a state of the suspended vehicle body, and developing a force command controlling force between sprung and unsprung masses in each quarter car suspension, the force command equal to the greater of the quarter car command and the semi-rigid body command.

8 Claims, 11 Drawing Sheets

U.S. PATENT DOCUMENTS

| | | | |
|---|---|---|---|
| 5,056,812 | 10/1991 | Takehara et al. | 280/707 |
| 5,062,657 | 11/1991 | Majeed | 280/707 |
| 5,072,392 | 12/1991 | Taniguchi | 364/424.05 |
| 5,142,476 | 8/1992 | Shibata et al. | 364/424.05 |
| 5,144,559 | 9/1992 | Kamimura et al. | 364/424.05 |
| 5,295,074 | 3/1994 | Williams | 364/424.05 |
| 5,323,319 | 6/1994 | Shimizu | 364/424.05 |

5,475,596

FULL CAR SEMI-ACTIVE SUSPENSION CONTROL BASED ON QUARTER CAR CONTROL

This invention relates to vehicle suspension systems and more particularly to actuator control of variable force semi-active suspensions. The subject of this application is related to following copending patent applications: 07/702,873 now U.S. Pat. No. 5,276,621 entitled "Semi-Active Suspension System with Electromechanical Damping" and 07/702,875 now U.S. Pat. No. 5,434,782 entitled "Suspension System State Observer," both filed concurrently with this specification and assigned to the assignee of this invention. The disclosures of patent applications 07/702,873 and 07/702,875 are incorporated into this document by reference.

BACKGROUND OF THE INVENTION

In the field of vehicle suspensions, the phrase "quarter car suspension" refers to the components of the vehicle suspension relating to one of the four wheels of the typical automotive vehicle. These components include the particular wheel with a tire that is in contact with the road, a spring that transfers the road force to the vehicle body (sprung mass) and suspends the vehicle body, and a damper or actuator that reduces undesirable relative movement between the vehicle body and wheel. The complete suspension system of an automotive vehicle comprises four quarter car suspensions.

In recent years, vehicle manufacturers have dedicated significant effort to developing suspension systems responsive to the driving conditions of the vehicle. This effort is triggered by desire to incorporate the best features of soft and stiff suspension systems into a single vehicle suspension system. The best feature of a soft vehicle suspension is the smooth ride it provides for the vehicle passengers. The best feature of a stiff vehicle suspension is the increased handling performance it provides for the vehicle.

The theory of semi-active suspension systems is to selectively switch between stiff suspension and soft suspension in response to the particular driving conditions of the vehicle. Selection between stiff suspension and soft suspension may be obtained by altering the damping force of the suspension system, e.g., a greater damping force for a stiffer suspension and a lower damping force for a softer suspension. With correct control of suspension damping force, a vehicle can provide both optimum driving comfort and optimum handling performance. Semi-active suspension systems (along with active systems) can be referred to as variable force suspension systems.

Difficulties in designing variable force suspension systems lie partially in system controls. For example, the state of the suspension at each wheel of the vehicle is affected not only by road disturbance on the wheel, but by the rigid body characteristics of the vehicle body.

What is desired is a suitable system for integrating four semi-active suspension systems into a vehicle to provide optimum vehicle handling and ride comfort.

SUMMARY OF THE PRESENT INVENTION

This invention provides a means and method of controlling four quarter car semi-active suspension systems in a vehicle. The invention controls the variable force damper of each quarter car suspension in response to both the effect of the road on the particular wheel for that quarter car suspension and the rigid body characteristics of the vehicle body.

The control method of this invention enables the semi-active suspension system to eliminate the effects of road disturbances and rigid body motion on vehicle ride and handling. The rigid body motions, such as body heave, pitch, roll and yaw caused by forces transferred to the vehicle body through the suspension and like motions caused by forward and lateral accelerations of the vehicle, are reduced, increasing performance in vehicle ride and handling.

The method of control of this invention comprises the steps of (i) developing a quarter car command for each quarter car suspension in response to the state of that quarter car, (ii) developing a semi-rigid body command in response to a signal representative of the motion-state of the suspended vehicle body, and (iii) developing a force command controlling force between sprung and unsprung masses in each quarter car suspension, the force command equal to the greater of the quarter car command and the semi-rigid body command.

The state of each quarter car can be represented by at least one signal representing at least one of a group of parameters, including absolute position of the sprung mass, absolute position of the unsprung mass, absolute velocity of the sprung mass, absolute velocity or the unsprung mass, relative position of the sprung and unsprung masses and relative velocity of the sprung and unsprung masses. The signal representing the state of the vehicle body may be any signal indicating body motion, or impending body motion, including, signals indicating forward acceleration, lateral acceleration, braking, steering wheel angle, and vehicle velocity.

DETAILED DESCRPTION OF THE INVENTION

Figure 1:
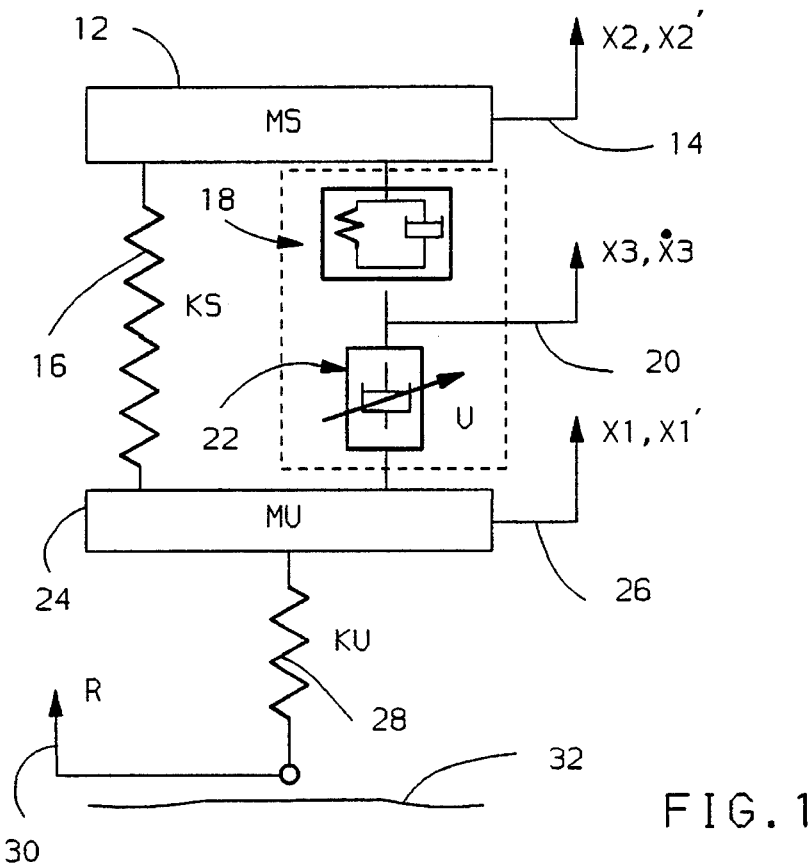
FIG. 1 is an equivalent schematic diagram of a variable force quarter car suspension.

A suspension system of the type of which four may be installed in a vehicle with the control method of this invention may be understood with reference to the model diagram of FIG. 1. In the figure, reference numeral 12 generally designates the sprung mass, having mass $M_s$, which is the vehicle body supported by the suspension. The sprung mass has a position, $x_2$, and a velocity, $x_2'$, both represented by line 14. The sprung mass 12 is supported by the spring 16, having a constant $k_s$. The spring 16 is also connected to the unsprung mass 24, which represents the vehicle wheel. The unsprung mass 24, having mass $M_u$, has a position, $x_1$, and a velocity, $x_1'$, both represented by line 26. The tire of the vehicle is modeled as a spring 28, having a spring constant $k_u$. The road is represented by reference numeral 32 and affects a displacement R (line 30) on the tire 28.

Variable force between the sprung and unsprung masses 12 and 24 is provided in the suspension system by actuator 22. Actuator 22 may be an adjustable damper or an actuator capable of both damping and providing a force independent of damping on the suspension system. Actuator 22 may be an electromechanical machine, including a linear electromechanical machine, hydraulic shock with a flow control or bypass valve, or any other means of providing variable force to the suspension. The actuator 22 is attached between the unsprung mass 24 and a rubber bushing 18, which is modeled as a nonlinear spring in parallel with a damper. Rubber bushing 18 is similar to bushings used in engine mounts and is optional. If the rubber bushing 18 is omitted, the actuator 22 is attached directly to the sprung mass 12. In general, the actuator 22 exerts a force on the unsprung mass 24 and an equal and opposite force on the sprung mass 12, through rubber bushing 18, in proportion to the relative speed of the sprung and unsprung masses 12 and 24 and/or an input control signal.

In the suspension system, the road 32 affects a displacement R on the tire 28, which in turn applies a force on the unsprung mass 24. The unsprung mass 24 transfers force to the spring 16 which in turn applies force on the sprung mass 12. The actuator 22 applies force on the sprung mass 12 (through bushing 18, if used) and unsprung mass 24 in the direction opposite the relative direction of travel of the two masses.

The bushing 18 is optional but may be preferable to help reduce the effect of high frequency road surface disturbance on the system. In the model of the suspension system set forth below, the effect of the rubber bushing is ignored and accounted for as a system uncertainty. Suspension systems of the type represented by FIG. 1 are easily implemented by those skilled in the art.

Figure 2:
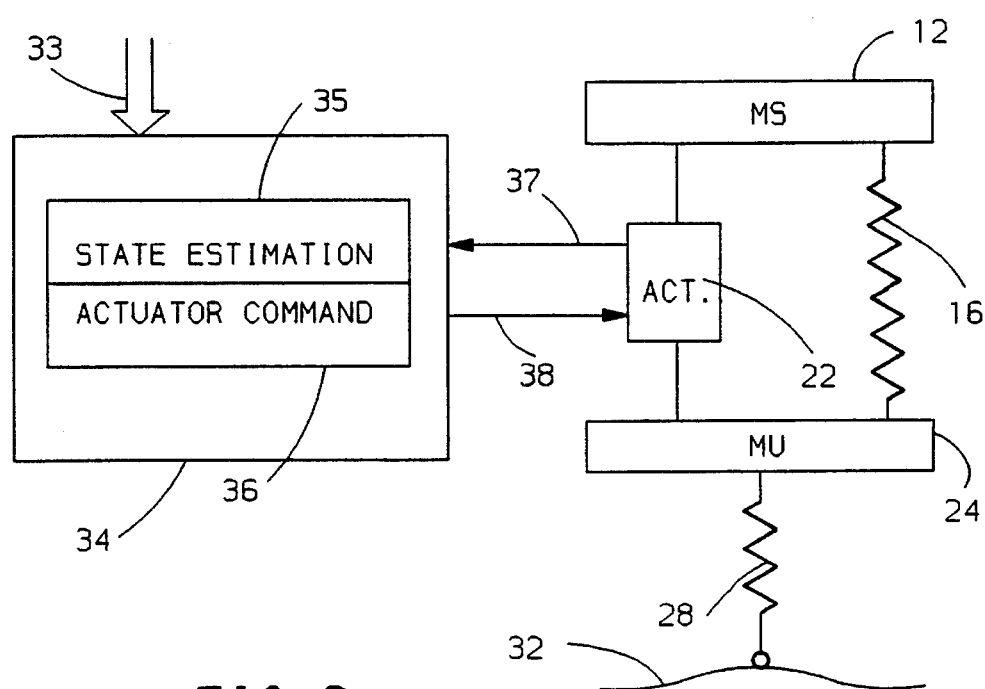
FIG. 2 is an equivalent schematic diagram of a quarter car suspension with a controller.

Referring to FIG. 2, apparatus for control of the suspension system shown in FIG. 1 includes the controller 34 comprising a state estimator 35 (also referred to as the observer) and the actuator command generator 36. The controller 34 receives a signal on line 37 representative of the relative system state. The signal on line 37 may be developed by actuator 22 or an independent sensor, such as a LVDT (not shown). In response to the signal on line 37 and previous state estimations, the state estimator 35 estimates the current suspension system state (a more detailed explanation is set forth below with reference to FIG. 5). The actuator command generator 36 develops a force command, controlling the force between sprung and unsprung masses 12 and 24 applied by actuator 22, in response to the state estimation and provides that command on line 38 (an example implementation is also explained below with reference to FIG. 5).

Actuator 22 may be a damping electromechanical actuator which variably generates and dissipates power or a damping hydraulic actuator with means for variable flow control.

The bus 33 represents signals of various other vehicle parameters that may, at times, be taken into account to develop the actuator command at box 36. These signals may include semi-rigid body characteristics of a vehicle body and example implementations according to this invention are set forth in detail below.

Figure 3:
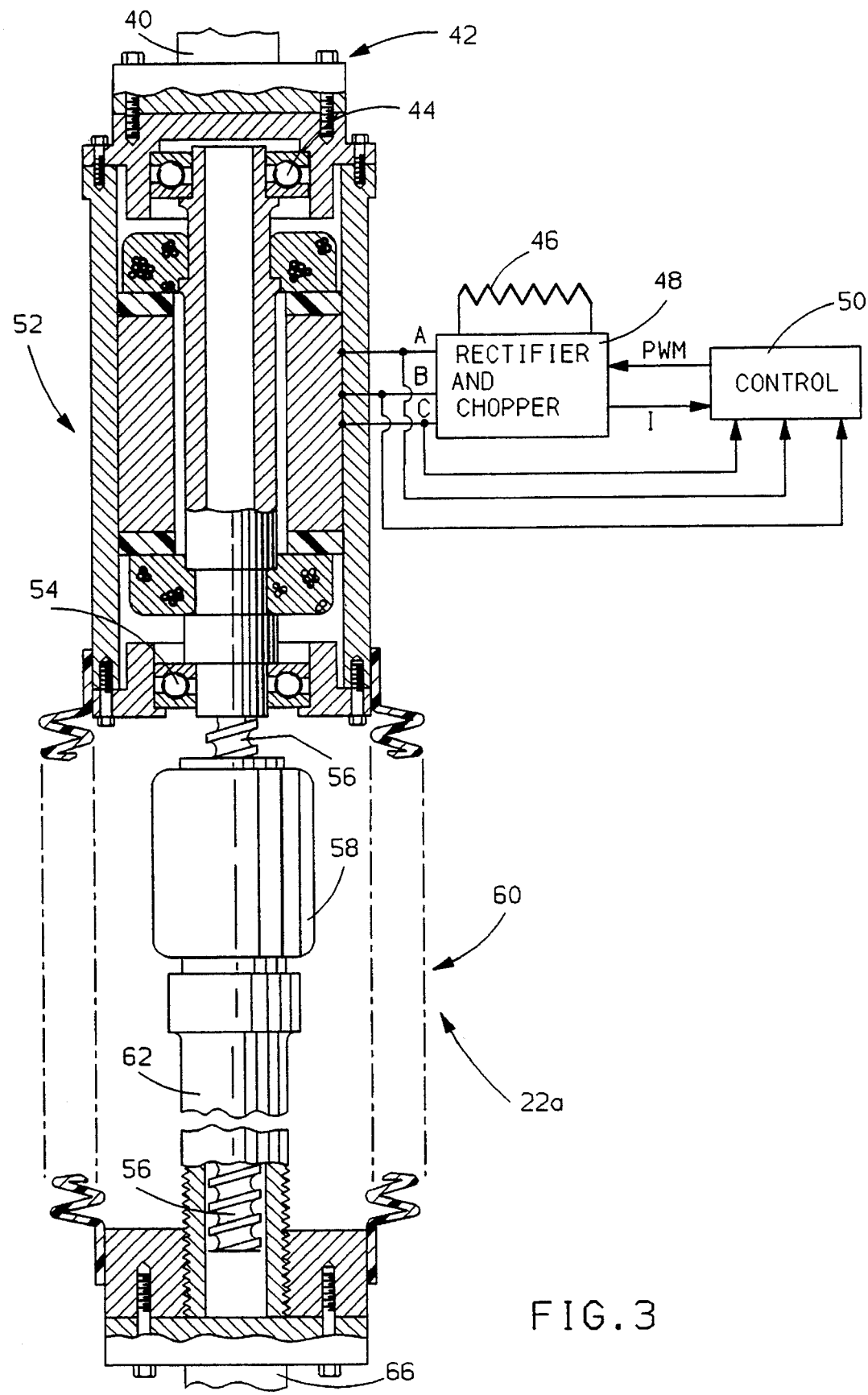
FIG. 3 is an example damper for a quarter car semi-active suspension system.

Referring to FIG. 3, one example of the actuator 22 may be the unit 22a, including an electromechanical machine 42. In the figure, the electromechanical machine 42 comprises a linear to rotary motion converter 60 and a rotary multi-phase alternator 52. The linear to rotary motion converter 60 includes a ball screw cage 58, hollow connector 62, screw 56 and lower connector 66. The rotary multi-phase alternator 52 is rotatably mounted through bearings 44 and 54 to the upper connector 40. The lower connector 66 is mounted to the unsprung mass 24 (FIG. 1) and the upper connector 40 is mounted to the sprung mass 12 (FIG. 1), through rubber bushing 18, if used.

Through the relative movement of the sprung mass 12 and the unsprung mass 24 acting on the connectors 40 and 66, the ball screw 56 is forced to rotate, rotating the rotary multi-phase alternator 52 and creating electric potential on lines A, B, and C, which are connected to the rectifier and chopper apparatus 48. In response to the controller 50, which generates a pulse width modulated control signal, corresponding to the force command, on line PWM, the rectifier and chopper 48 selectively dissipates the power generated by alternator 52 through load resistor 46, providing the desired damping force for actuator 22a. During high frequency movements of the unsprung mass 24, e.g., on a very bumpy road, the rubber bushing 18 (FIG. 1) attenuates the inertial effect of actuator 22 on the suspension system performance. Optionally, the actuator 22a may be used as a brushless DC motor by including three hall effect sensors and used with an inverter circuit. Another option is to use a linear electromechanical actuator.

Figure 4:
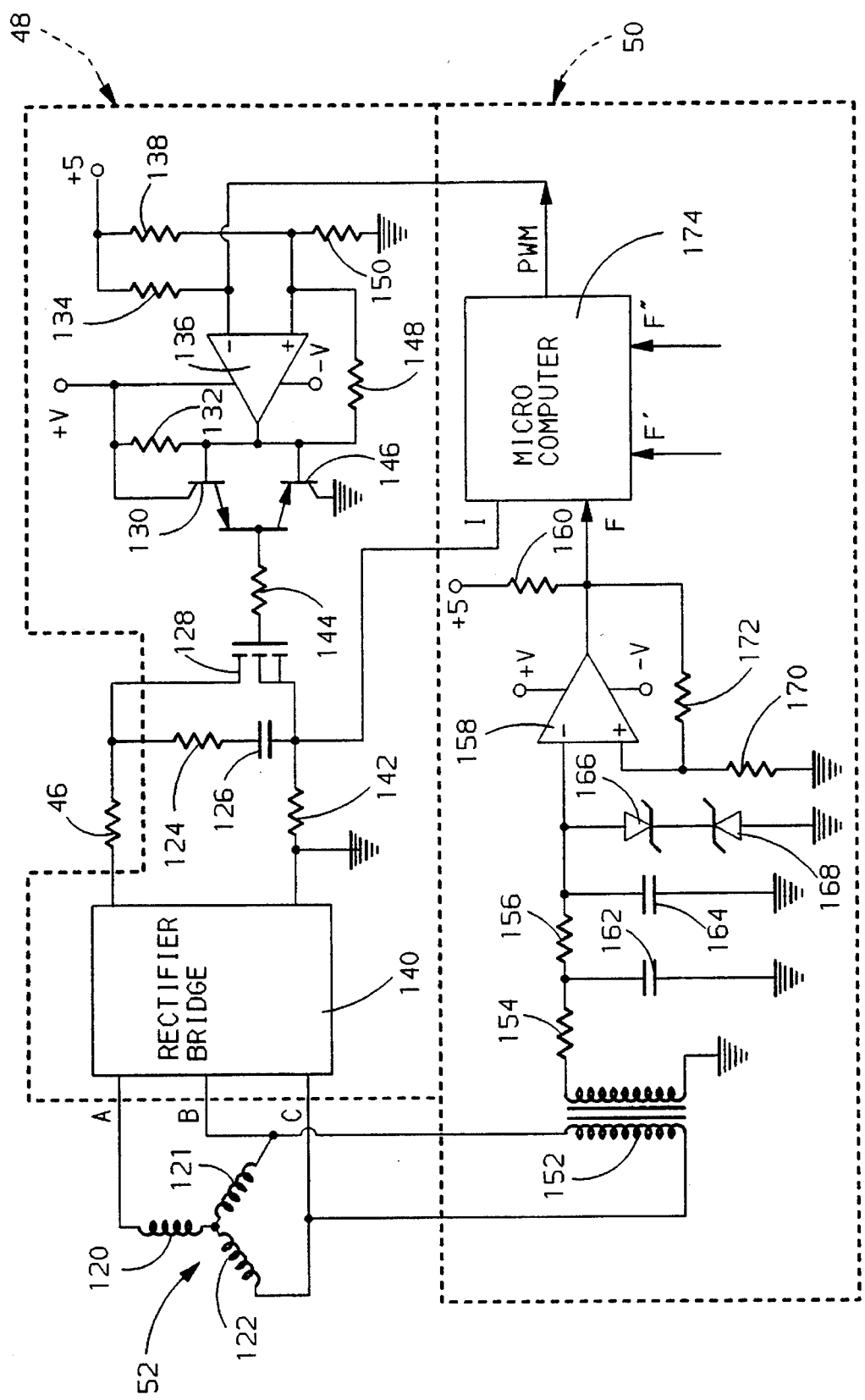
FIG. 4 is a schematic diagram of example circuitry for controlling the damper in FIG. 3.

The rectifier and chopper 48 and the controller 50 can be better understood with reference to FIG. 4. Coils 120, 121, and 122 of the alternator 52 are connected to a rectifier bridge 140 which rectifies the three phase voltage on lines A, B, and C. In response to a control signal on line PWM, the circuit comprising operational amplifier 136, transistors 130 and 146, and resistors 132, 134, 138, 144, 148, and 150 control MOSFET 128, selectively closing a DC circuit between resistors 46 and 142, dissipating the power generated by alternator 52. The duty cycle of the signal on line PWM determines the amount of damping force. Example values for the resistors and capacitor are as follows: resistor 46, 1.67 $\Omega$, 150 W; resistor 142, 2 m$\Omega$; resistor 124, 50 $\Omega$; capacitor 33, 0.1 uF; resistors 134, 138, and 150, 10 K; resistor 148, 100 K; resistor 132, 1.5 K; and resistor 44, 100 $\Omega$.

Line I may be implemented as an option to provide a damping force feedback loop for electromechanical implementations. There will probably be sufficient inductance in the circuit of alternator 52, rectifier bridge 140 and load resistor 46 that the duty cycle modulation of MOSFET 128 produces an average DC current with a small ripple. If so, the current signal I read into microcomputer 174 is already averaged. If any additional averaging is required, it can be done with a standard digital averaging algorithm in microcomputer 174 applied to successive values of I.

It is desirable to detect the relative velocity of the sprung and unsprung masses 12 and 24, otherwise known as the rattle space velocity, or the relative position of the sprung and unsprung masses 12 and 24. Either implementation is acceptable.

The rattle space velocity may be determined a variety of ways. One implementation is to determine the frequency of the zero crossings of the voltages on lines A, B, and C.

The circuit comprising transformer 152, operational amplifier 158, resistors 154, 156, 160, 170, and 172, capacitors 162 and 164, and zener diodes 166 and 168 provide a pulse to the microcomputer 174 on line F with every zero crossing of the voltage between lines B and C. Preferably, identical circuits are connected between lines A and C and between lines A and B to provide zero crossing pulses on lines F' and F'', respectively. The frequency of the signals on lines F, F' and F'' determines the magnitude of the rattle space velocity and the direction of the rattle space velocity is determined by the order of the signals on lines F, F' and F''. The calculation of the rattle space velocity is performed by microcomputer 174 through a computer routine easily implemented by one skilled in the art. Example values for the capacitors and resistors are: resistors 154, 156 and 170, 10 K; capacitor 162, 0.0015 uF; capacitor 164, 0.33 uF; resistor 160, 3 K; and resistor 172, 470 K. A more detailed description of the actuator 22a and related circuitry is set forth in U.S. Pat. No. 4,815,575, to Murty, assigned to the assignee of this invention, and will not be set forth herein.

If the relative position of the sprung and unsprung masses 12 and 24 is to be determined, an LVDT-type sensor (not shown) is attached between the sprung and unsprung masses 12 and 24. The LVDT sensor provides an output signal linearly related to distance between the sprung and unsprung masses and the output signal is provided to an A/D converter (not shown), the output of which is connected to the microcomputer 174 for processing. Any suitable position sensor may be used as an alternative.

Figure 5:
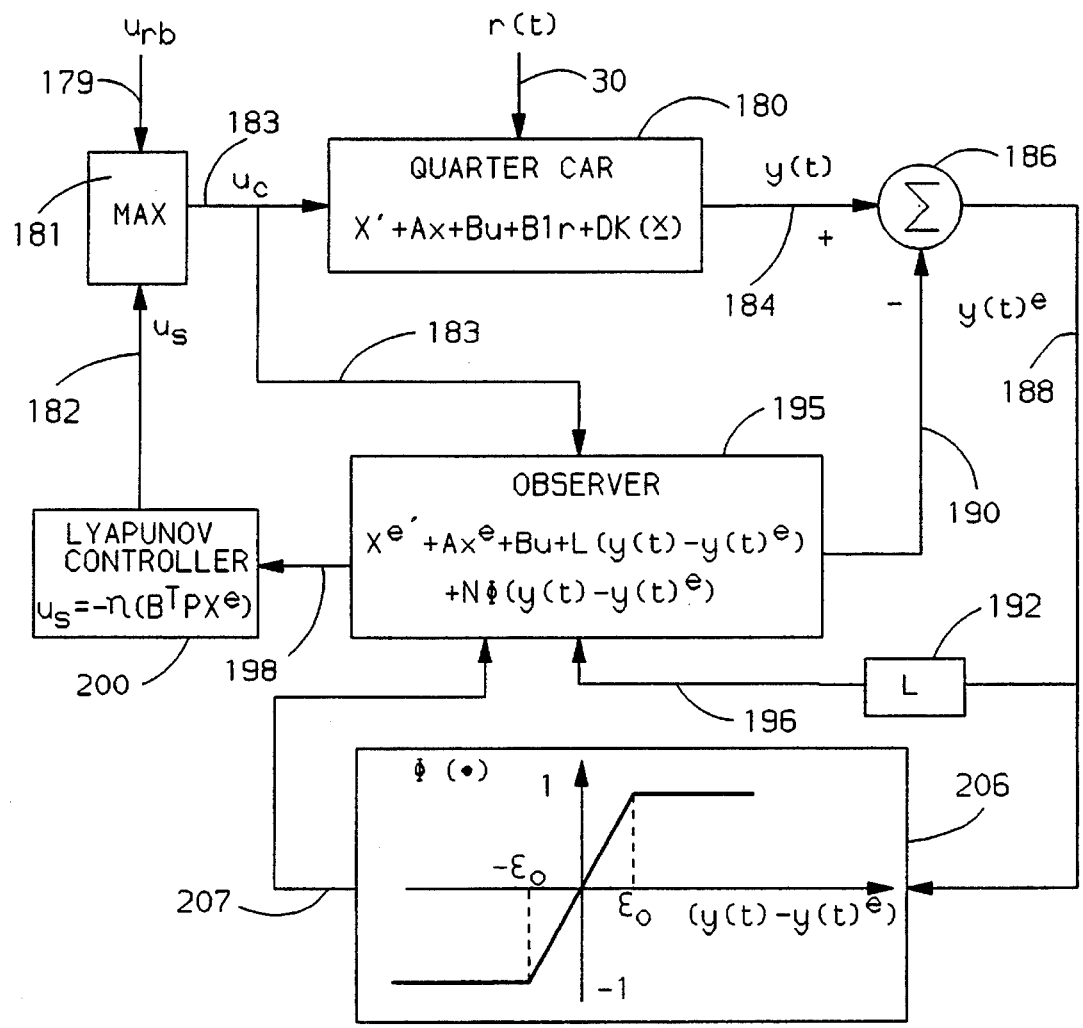
FIG. 5 is a flow diagram showing a preferred control structure for developing a quarter car semi-active suspension command.

One example of a means for determining the state of the suspension system includes the observer 195 shown in FIG. 5 including a linear Luenberger term and a nonlinear signum term. The observer 195 is also set forth in copending patent application Attorney Docket No. G-7238, entitled "Suspension System State Observer," filed concurrently with this application, assigned to the assignee of this invention, and incorporated into this specification by reference. The observer 195 estimates the entire system state $X^{e'}$ (comprising $x_1^e$, $x_1^{e'}$, $x_2^e$ and $x_2^{e'}$) and computes the estimated relative system state, $y^e(t)$.

The observer 195 estimates the state of the quarter car suspension system according to the model:

$$x^{e'} = AX^e + Bu + L(y(t) - y(t)^e) + N\Phi(y(t) - y^e(t)),$$

where A and B are standard model matrices for a suspension system with control, $X^e$ is the previous estimated system state, u is the control (representing the actuator force of actuator 22 and may be either the quarter car command or the semi-rigid body command, whichever is applied), L is a linear Luenberger matrix that provides stabilizing linear feedback (the function $L(y(t) - y^e(t))$ is referred to below as the linear correction term), y(t) is the measured relative system state of the sprung and unsprung masses 12 and 24, N is a proportionality constant, and the term, $\Phi(y(t) - y^e(t))$ (referred to below as $\Phi(.)$), is a saturation function and provides a stable nonlinear element to the model that guarantees that state estimations progress in the direction of a stable sliding surface, $y(t) - y^e(t) = 0$, on an X, X' stability plot.

For purposes of simplification of the model, the characteristics of the rubber bushing 18 (FIG. 1) are not modeled, but accounted for by the non-linear term as error. The estimated relative system state, $y^e(t)$, is related to the state, $X^e$, as follows:

$$y^e(t) = CX^e,$$

where the matrix C is a standard suspension system model matrix.

The matrix A is a standard suspension model matrix easily implemented by one skilled in the art as follows:

$$A = \begin{pmatrix} 0 & 1 & 0 & 0 \\ a_1 & a_2 & a_3 & a_4 \\ 0 & 0 & 0 & 1 \\ a_5 & a_6 & a_7 & a_8 \end{pmatrix}.$$

In implementing the model, those skilled in the art realize that the model parameters of matrix A, in a damper where inertial effects are significant, are as follows:

$a_1 = (j^2(k_s M_u - jn^2 k_u) - (k_u + k_s)c_1)/((M_u + jn^2)c_1);$ $a_2 = (jn^2 b_p M_u - c_1 b_p)/((M_u + jn^2)c_1);$ $a_3 = (c_1 k_s - jn^2 k_s M_u)/((M_u + jn^2)c_1);$ $a_4 = (c_1 b_p - jn^2 b_p M_u)/((M_u + jn^2)c_1);$ $a_5 = (k_s M_u - jn^2 k_u)/c_1;$ $a_6 = b_p M_u/c_1;$ $a_7 = -k_s M_u/c_1;$ $a_8 = -b_p M_u/c_1,$ where $b_p$ is the passive damping force on the system, e.g., when zero power is being dissipated in resistor 46 of actuator 22 above, j is the rotary inertia of the electromechanical machine 52, n is the gear ratio, and $c_1$ equals the quantity $(M_u M_s + jn^2(M_u + M_s))$.

The matrix B is as follows:

$$B = \begin{pmatrix} 0 \\ b_1 \\ 0 \\ b_2 \end{pmatrix},$$

where, for the system where inertial effects are significant, $b_1 = (jn_2 M_u - c_1)/((M_u + jn^2)c_1$ and $b_2 = M_u/c_1$. If the relative system state is to comprise the relative velocity between the sprung and unsprung masses 12 and 24, the matrix C may be described as C = [0 1 0 −1], so that $y^e(t) = x_1^{e'} - x_2^{e'}$. If the relative system state is to comprise the relative position between the sprung and unsprung masses 12 and 24, the matrix C may be described as C = [1 0 −1 0], so that $y^e(t) = x_1^e - x_2^e$.

The Luenberger matrix L is generally solved for by determining a stable point for matrix [A—LC], with its poles placed anywhere on the left hand plane of the real-imaginary coordinate system provided that the pair (A, C) is observable. Those skilled in the art of state estimation can easily implement the Luenberger matrix with the limitations set forth above.

The first three terms of the model $(AX^e + Bu + L(y(t) - y^e(t)))$ are a linear estimation of the system state. However, because of the difficulty of measuring the absolute displacement of the suspension system, the nonlinear mount, the system uncertainties, and the unknown road disturbances, the linear equation alone cannot converge the estimated system state to the actual system state. To ensure accurate estimations of $X^{e'}$, a nonlinear function is added. The nonlinear function compensates for road disturbance, system uncertainties, non-linearities in the system, if any, and errors in the estimation model.

To further clarify the nonlinear function, assume the worst case (normal operation) road disturbance and other uncertainty effects on the suspension system can be represented by a term Ed, where d=1 for the worst case. One skilled in the art can easily determine E. Since, for the worst case d= 1, for any given normal driving condition, $|d| \leq 1$. If N is set equal to $E\gamma$, where $|\gamma| \leq 1$, then a stable nonlinear function, $\Phi(y(t)-y^e(t))$, can be set up as follows:

$$\Phi(y(t)-y^e(t)) = \begin{cases} 1, & (y(t)-y^e(t)) \geq \epsilon_o \\ (y(t)-y^e(t))/\epsilon_o, & -\epsilon_o < (y(t)-y^e(t)) < \epsilon_o \\ -1, & (y(t)-y(t)e) \leq -\epsilon_o \end{cases}$$

where $\epsilon_o$ defines an error limit around the sliding surface $y(t)-y^e(t)=0$ within which the system is linearly stable and outside of which the system is non-linearly stable. To ensure nonlinear stability, all real parts of a function $H_1(j\omega)$ must lie to the right of $-1/G$ on a real/imaginary plot, where:

$H_1(j\omega)=C(j\omega I-A+LC)^{-1}N$, and $G=(1+1/\gamma)/\epsilon_o$.

To ensure linear stability within the boundary layer defined by $\|y(t)-y^e(t)\|<\epsilon_o$, the following matrix must be stable:

$[A-(L+N/\epsilon_o)C]$.

To optimize the system, assume a high $\gamma$ and a low $\epsilon_o$, and adjust $\epsilon_o$ until the system is stable. If the system cannot be stabilized, lower $\delta$ and again adjust $\epsilon_o$. In general, a smaller $\epsilon_o$ corresponds to a smaller allowable error. Repeat the adjustment of $\delta$ and $\epsilon$ until an optimum stable system is found. It is preferable to find several stable combinations of $\gamma$ and $\epsilon_o$ and to pick the system which yields the smallest estimation errors.

With the above information, one skilled in the art can easily implement the nonlinear term $N\Phi(.)$ to achieve a stable system. During normal driving conditions, the resulting control system is linearly stable and the estimated system state can converge to the actual system state (zero error condition). During driving conditions such as a wheel hitting a large pothole or a large rock, the control system is non-linearly stable and progresses to a state where it is linearly stable.

Referring to FIG. 5, the state estimation by the observer 195 can be easily understood. The road disturbance on line 30 and the commanded actuator force $u_c$ on line 183 affect the quarter car suspension system, represented by block 180, such that an actual relative system state, y(t), on line 184 is developed. At block 186, the estimated relative system state, $y^e(t)$, is compared to the actual relative system state, and an error signal, $e(t)=y(t)-y^e(t)$, on line 188, is developed. The error signal on line 188 is multiplied by the Luenberger matrix L at box 192 and the result is added with the rest of the estimation model in block 194. The error signal on line 188 is also input into the nonlinear function box 206 where the nonlinear function is determined and added with the rest of the estimation model in block 195.

A signal representative of the actuator force command, $u_c$, the maximum, as determined at box 181, of the quarter car command $u_s$ on line 182 from controller 200 and the rigid body command $u_{rb}$, on line 179 (explained below), is input into block 195 through line 183 (optional). The system actuator force, u, is determined at block 195 through one of a variety of different means. The actuator force, u, may be determined in relation to a signal such as on line I in FIG. 4. Alternatively, the actuator force, u, may be determined from a three dimensional look-up table with reference to y(t) and the force command, $u_c$. In block 195, the estimations $X^{e'}$ and $y^e(t)$ are determined as described above and output on lines 198 and 190, respectively.

Figure 6:
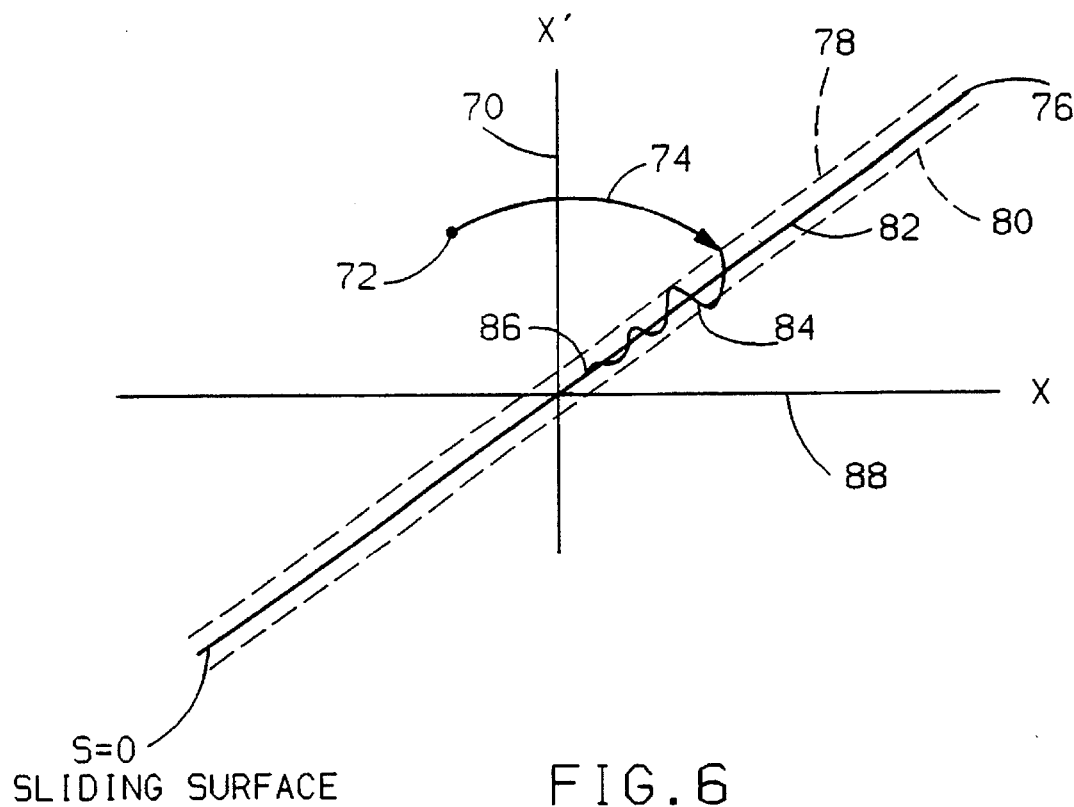
FIG. 6 is a sliding surface plot relating to the observer of FIG. 5.

FIG. 6 is an illustrative example of how the stable observer achieves accurate estimations. Line 76, referred to as a sliding surface, on the X and X' axes, 88 and 70, represents the actual suspension system state. Whenever state estimated by observer 195 falls on sliding surface 76, the estimation error is zero. Assume a large disturbance on the suspension system causes state estimation error, the estimated state represented by point 72, not on the sliding surface 76. When this occurs, the saturation function saturates the state estimations in a manner to cause the state estimations to return toward the sliding surface 76 along a path, such as path 74. In this mode, the observer is acting non-linearly. Once the state estimation is within a boundary shown as dotted lines 78 and 80 (corresponding to $\epsilon_o$) of the sliding surface 76, the observer is linear and the state estimations oscillate along path 84 until the estimated states converge with the actual state at point 86. An important feature of this control method is that the estimation error is guaranteed to go to zero without having to satisfy a matching condition in the design phase of the system.

Referring again to FIG. 5, the output of the observer 195, on line 198, is input into the modified Lyapunov controller 200. The modified Lyapunov controller 200 controls the quarter car actuator force command, $u_s$ (line 182) in response to the estimated state $x^e$ on line 198 in a manner to drive the state to a reference condition.

The typical Lyapunov controller is a two state min-max controller, however, the modified Lyapunov controller preferred, which is the subject of copending application Attorney Docket Number G-2343, has the following control function:

$$u_s = -\begin{cases} 0, & B^T P X^e \leq \epsilon_d \\ (B^T P X^e)\rho/B^T P X^e, & B^T P X^e \geq \epsilon, \\ (B^T P X^e - B^T P X^e \epsilon_d/(B^T P X^e))\rho/(\epsilon-\epsilon_d), & \epsilon_d < B^T P X^e < \epsilon \end{cases}$$

where $\epsilon_d$ is the dead zone limit set to correspond to sensor noise and the allowable estimation error (if any), $\epsilon$ is the boundary layer limit set greater than $\epsilon_d$ to ensure smooth transition between minimum and maximum actuator force (thereby eliminating chatter), $\rho$ is the maximum available force at a given rattle space velocity, and $\|B^T P X^e\|$ can be referred to as the magnitude of the system state. When the controller output, $u_s$, is zero (and $u_{rb}$ also equals zero), the actuator force, u, is the minimum damping of the system, which may be zero or may follow a rattle space velocity dependent curve. When $u_s$ is $(B^T P X^e) \rho/\|B^T P X^e\|$, the actuator force u is the maximum actuator force of the system (in the semi-active case the maximum actuator force is a damping force and may be dependent upon rattle space velocity). When $u_s$ is $(B^T P X^e - \|B^T P X^e\| \epsilon_d/(B^T P X^e)) \rho/(\epsilon - \epsilon_d)$ (and greater than $u_{rb}$), the actuator force u is $(\|B^T P X^e\| - \epsilon_d)/(\epsilon - \epsilon_d)$ percent between the minimum actuator force and maximum actuator force for the particular rattle space velocity.

Figure 7:
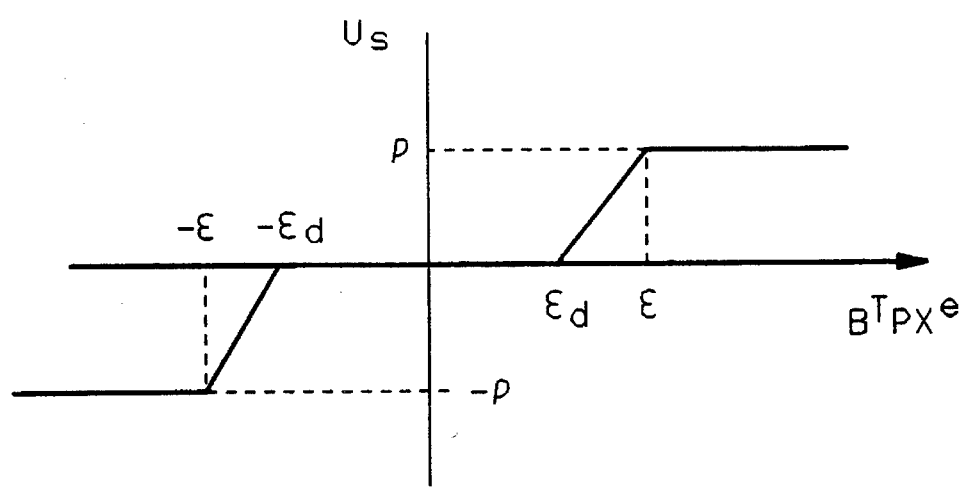
FIG. 7 is a graph of the output characteristics of the controller 200 shown in FIG. 5.

The output of the controller is shown in FIG. 7. The dead band, between $-\epsilon_d$ and $\epsilon_d$ on the $B^T P X^e$ axis, represents minimum possible damping and eliminates detrimental effects of noise and estimation error on the system. The transfer regions between $-\epsilon$ and $-\epsilon_d$ and between $\epsilon$ and $\epsilon_d$ on the $B^T P X^e$ axis prevent chatter in the suspension system. The regions below $-\epsilon$ and above $\epsilon$ provide maximum available actuator force in the proper direction on the suspension system.

In implementation of the control of FIG. 5 in a semi-active system, the controller 200 is stable as long as matrix A is stable because the force, u, is always a damping force.

In implementation with actuator 22a in FIGS. 3 and 4, the microcomputer 174 executes a control routine which estimates the system state and calculates the desired actuator command $u_s$ and/or $u_{rb}$ (explained below). The signal on line PWM is pulse width modulated, preferably at a frequency of about 2 kHz, to provide the desired damping force. For example, if $\|B^T P X^e\| \le \epsilon_d$ (and $u_{rb}$= zero), then the duty cycle of the signal on line PWM is zero, resulting in zero power dissipation through resistor 46. If $\|B^T P X^e\| \le \epsilon$, then the duty cycle of the signal on line PWM is 100 percent, resulting in maximum dissipation of power in resistor 46. If $\epsilon_d < \|B^T P X^e\| < \epsilon$, then the duty cycle on line PWM is $(\|B^T P X^e\| - \epsilon_d)/(\epsilon - \epsilon_d)$ (if $u_{rb} < u_s$). As an optional feature, a measure of the actual damping force may be provided to the microcomputer through the signal on line I and may be used by the microcomputer in calculating the estimations at block 194. In actual practice, there may be some inherent damping in actuator 22a due to friction. This inherent damping may be either accounted for in the controller in relation to rattle space velocity, may be accounted for as part of $b_p$, or may be lumped in with the system error for purposes of this invention.

Figure 8:
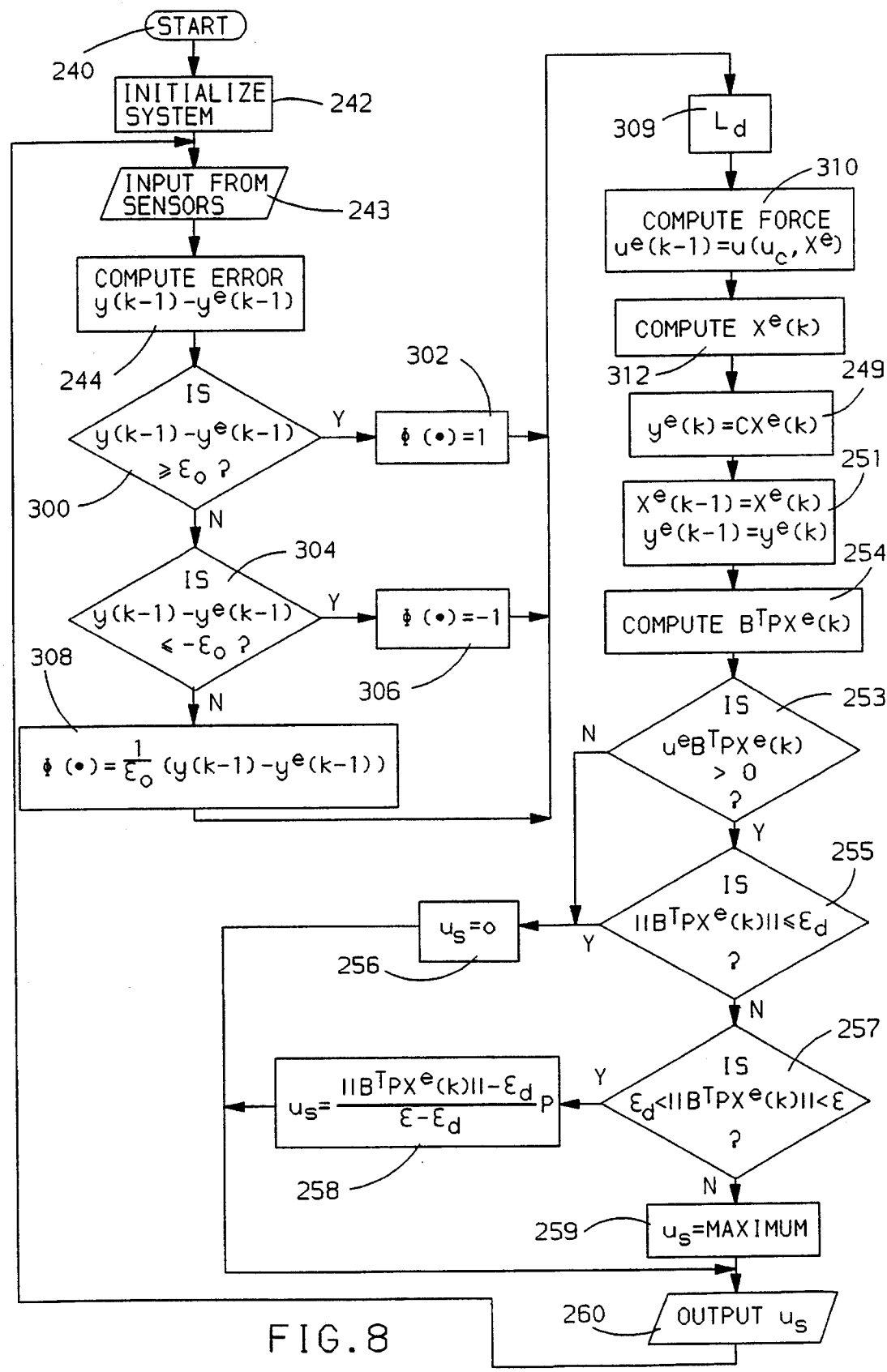
FIG. 8 is a flow diagram for a computer implementation of the control structure shown in FIG. 5.

The flow diagram of FIG. 8 is one example of a computer implementation of the control method of FIG. 5. The program starts at block 240 and initializes the system at block 242 (startup only). During initialization, the computer assigns zeros as the standard initial values to the estimated system states, $X^e(k-1)$ and $y^e(k-1)$, which are discrete representations of $X^e$ and $y^e(t)$ with k being the current time event and k–1 being the previous time event. Block 242 also assigns an initial value to the commanded damping force signal, $u_c(k-1)$. At block 243, the controller receives the sensor input including a signal representative of the relative system state $y(k-1)$ and, at block 244, determines the error between the measured and the previously estimated relative system state signals, $y(k-1) - y^e(k-1)$.

Block 300 compares $y(k-1) - y^e(k-1)$ to $\epsilon_o$. If $y(k-1) - y^e(k-1)$ is greater than or equal to $\epsilon_o$, then block 302 sets $\Phi(.)=1$. If $y(k-1) - y^e(k-1)$ is less than $\epsilon_o$, then block 304 compares $y(k-1) - y^e(k-1)$ to $-\epsilon_o$. If $y(k-1) - y^e(k-1)$ is less than or equal to $-\epsilon_o$, then block 306 sets $\Phi(.)$ equal to –1. If $y(k-1) - y^e(k-1)$ is between $-\epsilon_o$ and $\epsilon_o$, then block 308 sets $\Phi(.)$ equal to $(y(k-1) - y^e(k-1))/\epsilon_o$. The Luenberger term is computed at block 309 as described above and force, $u(u_c(k-1), X^e(k-1))$, is computed at block 310, the damping force, $u(u_c(k-1), X^e(k-1))$, is determined from a three dimensional look-up table in response to $u_c(k-1)$ and $X^e(k-1)$ (or $X(k-1)$ if the measured relative system state includes relative velocity), as described above. Block 312 computes $X^e(k)$, discretely, as follows:

$$X^e(k) = A_d X^e(k-1) + B_d u(k-1) + L_d(y(k-1) - y^e(k-1)) + N_d \Phi(y(k-1) - y^e(k-1)),$$

where:

$$A_d = e^{A\tau},$$

$$B_d = \int_0^\tau e^{At} dt B,$$

$$L_d = \int_0^\tau e^{At} dt L,$$

$$N_d = \int_0^\tau e^{At} dt N,$$

and where $\tau$ is the time period between successive estimations of $X^e(k)$ and e is the natural log base.

At block 249, the estimation of the relative suspension system state, $y^e(k)$, is computed, and at block 251, $X^e(k-1)$, the previous estimated system state, is set equal to $X^e(k)$ and $y^e(k-1)$ is set equal to $y^e(k)$. At block 254, the computer computes $B^T P X^e(k)$. At block 253, the computer computes the product of the force computed at block 310 and $B^T P X^e(k)$, and if the result is not greater than zero, $u_s$ is set equal to zero at block 256. This test determines if the present force $(u^e(k-1) = u(u_c(k-1), x^e(k-1)))$ is of proper direction, ensuring that the system operates only in the first and third quadrants as shown in FIG. 7 and is important because operation in the second and fourth quadrants causes the system to become unstable or yield undesirable results; the product $u^e(k-1) B^T P X^e(k)$ is a signal indicating proper present actuator force direction if it is positive, and improper present actuator force direction if it is negative.

If the product at block 253 is greater than zero, then block 255 compares $\|B^T P X^e(k)\|$ to $\epsilon_d$. Block 256 sets $u_s$ to zero if $\|B^T P X^e(k)\|$ was less than or equal to $\epsilon_d$ at block 255. If $\|B^T P X^e(k)\|$ was not less than or equal to $\epsilon_d$ at block 255, then block 257 determines if $\|B^T P X^e(k)\|$ is between $\epsilon_d$ and $\epsilon$, if so, then block 258 computes $u_s$ as:

$$(B^T P X^e(k) - \|B^T P X^e(k)\| \epsilon d/(B^T P X^e(k))) \rho/(\epsilon - \epsilon_d).$$

If $\|B^T P X^e(k)\|$ was not between $\epsilon_d$ and $\epsilon$ at block 257, then block 259 sets $u_s$ to command maximum possible actuator force. Block 260 outputs the command $u_s$, which controls actuator force if greater than $u_{rb}$, described below, and returns to block 243 to repeat the loop.

Implementation of the control of FIG. 5 into a suspension system results in suspension system control responsive to the entire suspension system state, enabling the increased controller response. The implementation illustrated above, results in a decrease in the magnitude of sprung mass displacement and velocity over the amount of sprung mass displacement and velocity in a passive suspension system. Sprung mass accelerations are also reduced. The amount of improvement will vary from implementation to implementation.

When using this invention in a vehicle, it is important to note that the present state of each quarter car suspension system and the road input are not the only factors that operate on each suspension system. The suspended mass of a vehicle is a semi-rigid body and the motion of each portion of the suspended mass generally affects the other portions of the suspended mass. The semi-rigid body motions of primary concern in a vehicle are heave, pitch and roll. Heave can be adequately controlled by four quarter car controllers described above. However, for improved control of pitch and roll, it may be desirable to take into account the semi-rigid nature of the entire sprung mass of the vehicle.

Figure 9:
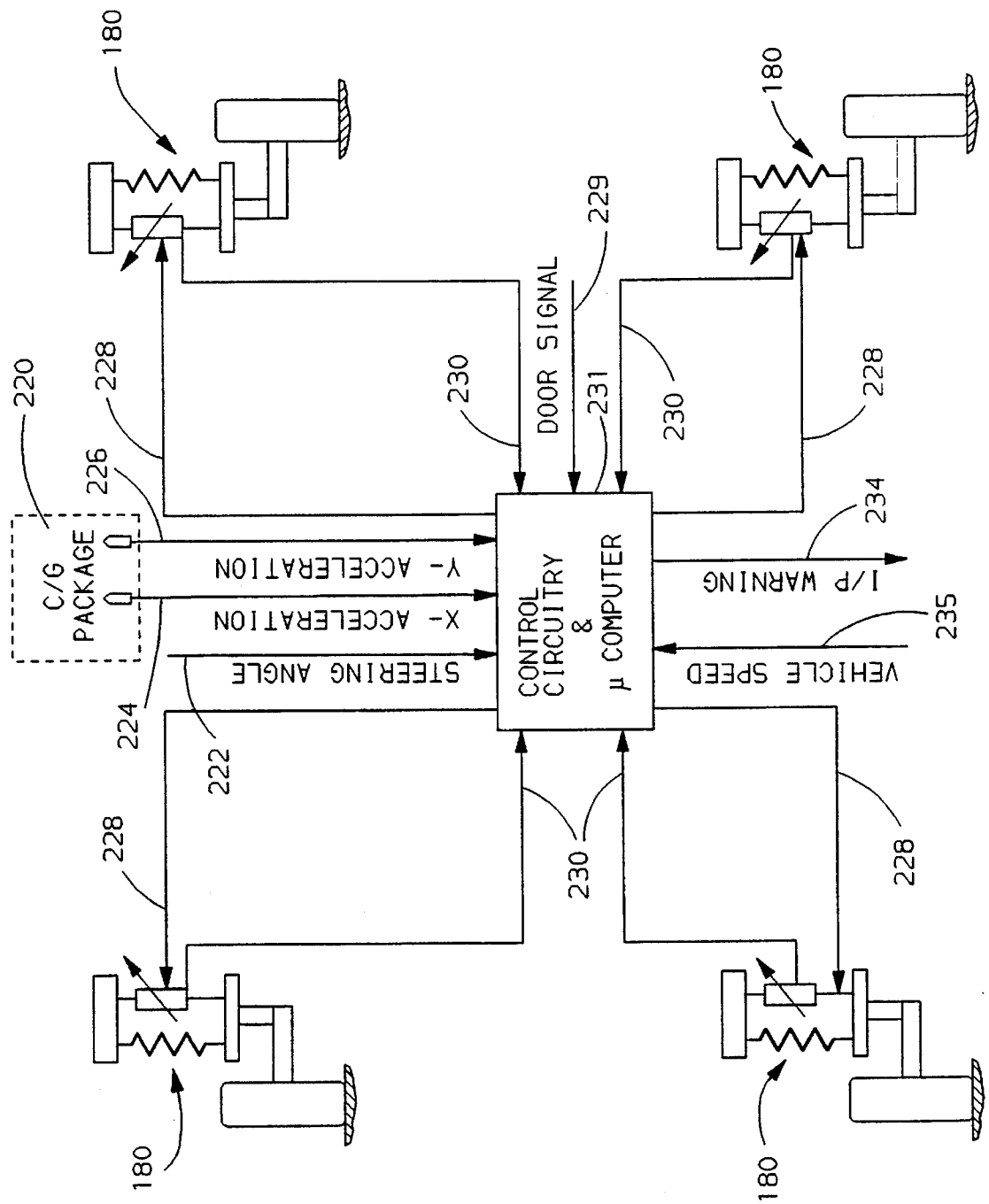
FIG. 9 is a schematic diagram showing four quarter car semi-active suspension systems integrated into one vehicle, for use with the control method of this invention.

Referring to FIG. 9, the integrated semi-active suspension system control of this invention is implemented in a vehicle including four quarter car suspensions 180 including variable force actuators 22. Signals indicative of the relative system state (rattle space velocity or relative position between the sprung and unsprung masses) of each quarter car suspension are provided to the controller 231 through lines 230. Signals representative of forward acceleration and lateral acceleration are provided to the controller 231 through lines 224 and 226, respectively, from transducers in a package 220 located at the vehicle center of gravity. Alternatively, package 220 may be offset from the center of gravity of the vehicle with the offset taken into account to compute the forward and lateral acceleration of the vehicle. These computations are easily implemented by one skilled in the art.

Although pitch and roll and yaw rate may be taken into consideration, they are not considered necessary because a significant portion of vehicle pitch and roll deviations result from forward and lateral accelerations of the vehicle body and yaw rate is not significantly affected in a semi-active suspension system. Therefore, for the sake of simplicity, it is preferable that only forward and lateral acceleration be taken into account.

One alternative implementation for determining forward and lateral acceleration is to have signals indicative of steering wheel angle and vehicle speed on lines 222 and 235 from a rotary (RVDT) sensor (or equivalent) on the steering column and the vehicle speedometer signal (not shown) input into the controller 231. The controller 231 can determine forward acceleration through differentiation of the vehicle speed signal. For example, forward acceleration, $A_f(k)$, may be determined as follows:

$$A_f(k)=(v(k)-v(k-2))/(2\Delta\tau),$$

where $v(k)$ is the current vehicle speed, $v(k-2)$ is the vehicle speed two time events previously, and $\Delta\tau$ is one time event.

Lateral acceleration can be determined in the controller from the vehicle speed and steering wheel angle through the following model, easily implemented by one skilled in the art:

$$a_y=v^2 g\delta/(r_s(gL+K_{us}v^2))$$

where $a_y$ is the lateral acceleration of the vehicle, v is the vehicle velocity, g is gravitational acceleration, $\delta$ is the steering wheel angular displacement, $r_s$ is the steering gear ratio, L is the wheel base, and $K_{us}$ is the under-steer coefficient. To reduce noise from the vehicle speed signal, v, the signal may be filtered through a low pass digital filter before the lateral acceleration is computed.

In the controller 231, determinations of forward and lateral acceleration are used to determine a minimum damping command (also referred to as the semi-rigid body command, $u_{rb}$), correlating to minimum damping forces, for the four quarter car suspensions. The greater the forward and/or lateral accelerations, the greater the minimum damping command, $u_{rb}$. The controller 231 also estimates a state and determines a damping command, $u_s$, for each quarter car suspension e.g., as described above. The computer selects between the minimum damping command, $u_{rb}$, and the individual quarter car damping command, $u_s$, for each quarter car system and issues a damping command, $u_c$, through line 228 corresponding to the command ($u_s$ or $u_{rb}$) which requires greater damping. By controlling the minimum damping as described above, deviations in pitch and roll can be minimized, providing increased road stability to the vehicle.

Figure 10:
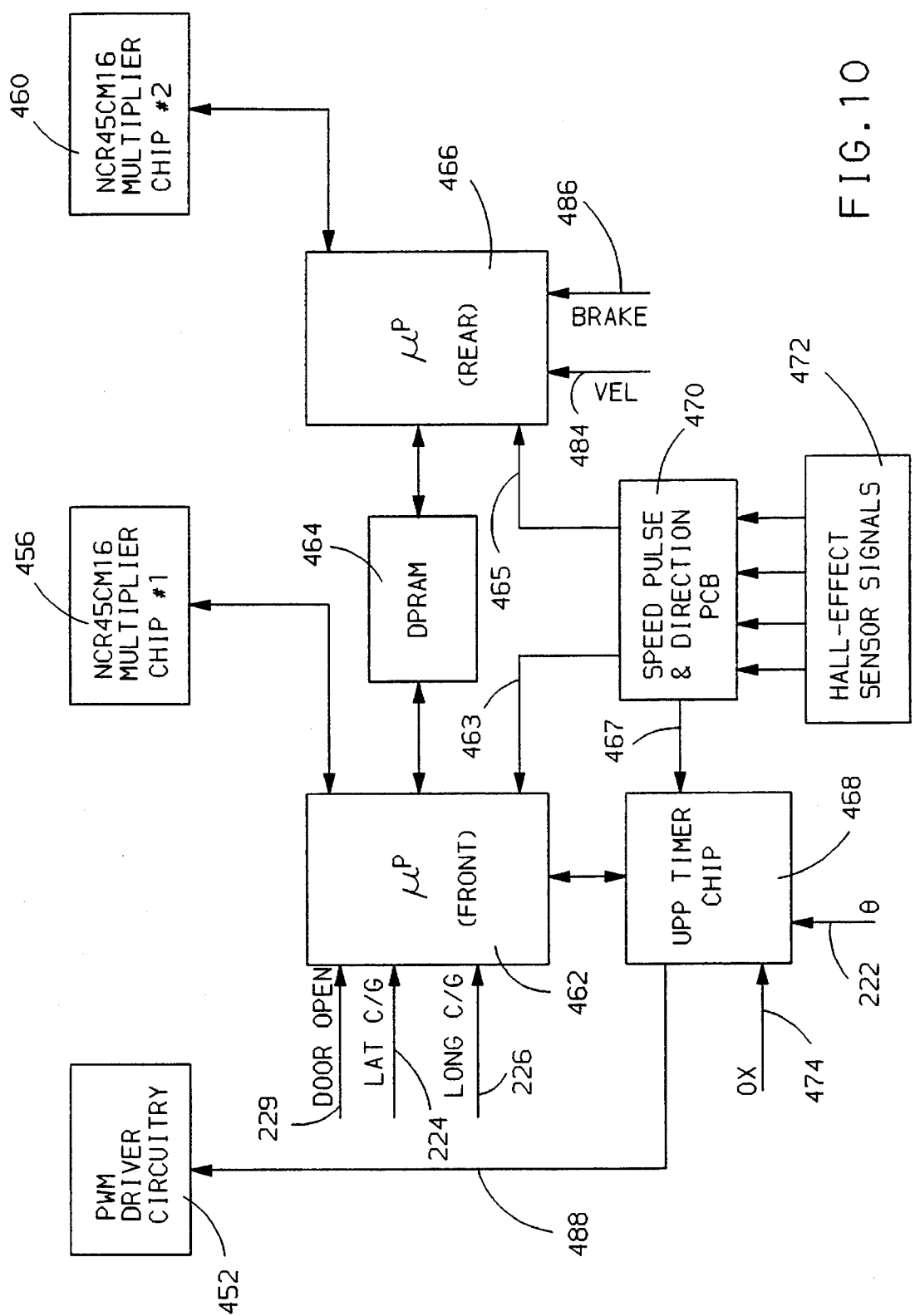
FIG. 10 is a more detailed diagram of one example of the apparatus of this invention.

An example of the controller circuitry 231 is shown in more detail in FIG. 10 and includes two eight bit microprocessors 462 and 466 (68CH11s may be used for low cost), one computing the individual quarter car commands for two quarters of the vehicle, the other computing the individual quarter car commands for the other two quarters of the vehicle. In the illustration, microprocessor 462 computes the quarter car commands for the front two suspensions and microprocessor 466 computes the quarter car commands for the rear two suspensions. Each microprocessor 462 and 466 runs the integration routine computing the semi-rigid body command. Dual port RAM 464 is used to exchange data between the two microprocessors. Each microprocessor 462 and 466 is interfaced with a math co-processor chip (456 and 460) to speed the computing power of the circuitry.

Each actuator 22a may contain three hall effect sensors (not shown) which may be used to determine rattle space velocity and/or direction of rattle space movement. Block 472 represents the Hall-effect sensors and the signals are fed to speed pulse and direction circuitry 470, providing frequency and direction signals. A frequency signal is provided for each quarter car by summing the signals from the three hall effect sensors from the actuator in that quarter car suspension unit. The frequency of the resultant signal for each quarter car represents the magnitude of the rattle space velocity of that quarter car suspension and is coupled to the microprocessors 462 and 466 through UPP timer chip 468, through bus 467.

The rattle space velocity magnitude signals are received by microprocessor 462 from timer chip 468, and the rear velocity signals are provided by microprocessor 462 to processor 466 through dual port RAM 464. The rattle space velocity directions are determined by speed pulse and direction circuitry 470 in relation to the order of signals from the hall effect sensors in each actuator and are provided directly to the microprocessors 462 and 466 through buses 463 and 465. Implementation of circuitry 470 is easily accomplished by one skilled in the art with no further explanation.

Although the hall effect sensors may be preferable in certain sensors, they are not necessary. Signals on bus 474, representing the relative displacement of the sprung and unsprung masses in each suspension unit may be fed to the UPP timer chip, and related therethrough to microprocessor 462, and through microprocessor 462 and dual access RAM 464 to microprocessor 466. Rattle space velocity and direction may be estimated from the relative displacement information using observer 195 (FIG. 5).

A steering wheel angle signal on line 222 is fed to the UPP timer chip 468, which provides the information for the microprocessors 462 and 466. Sensor information such as a door open signal and lateral and longitudinal acceleration signals may be fed directly to microprocessor 462 through lines 229, 224 and 226. The vehicle velocity signal and brake signals may be fed directly to microprocessor 466 through lines 235 and 486.

With the information provided, microprocessor 462 computes the damping commands for the front two suspensions and feeds the commands to UPP chip 468. Microprocessor 466 computes the damping commands for the rear two suspensions and feeds the commands to dual port RAM 464, where it is read by microprocessor 462 and fed to UPP chip 468. UPP chip 468 outputs pulse width modulated commands to each quarter car suspension through lines such as line 488, coupled to the PWM driver circuitry 452 for each quarter car suspension system.

In one example implementation, microprocessors 462 and 466, in conjunction with math co-processors 456 and 460, compute new individual quarter car commands every 2 ms and a new minimum damping command every 20 ms.

Various other factors may be taken into account when implementing this invention. For example, when persons get into and out of the vehicle and when cargo is loaded to and unloaded from the vehicle, the sprung mass of the vehicle changes and the at-rest state of each quarter car suspension system changes (e.g., the distance between the sprung and unsprung masses when the vehicle is at rest changes). If only the relative velocity of the sprung and unsprung masses are measured, then the system automatically resets the at rest state with changes of vehicle load. If the relative position of each sprung and unsprung mass is measured, a line 229 can be implemented to receive a vehicle door signal indicating when a door has been opened and closed. An easy implementation for this line is to wire it into the dome light circuit in the vehicle. When the computer senses that a door has just been closed, it reinitializes the suspension system control, to set the new at-rest state of each quarter car suspension system as the reference state. A similar feature may also be implemented with a signal detecting opening and closing of a vehicle trunk.

Although the sprung mass of the vehicle changes as passengers and cargo of the vehicle change, the control methods set forth above can robustly control the suspension system without changing the model parameters at every change in the sprung mass. However, if an LVDT position sensor is used to measure the relative distance between the sprung and unsprung mass 12 and 24 (FIG. 1), then new at rest state can be used to determine the amount of mass in the vehicle, e.g., the greater the at rest distance between the sprung and unsprung masses, the smaller the sprung mass. The model parameters of matrices A and B can be adjusted accordingly. Although altering the matrices A and B may be desirable in certain implementations, it is not necessary.

If the computer detects a failure of the suspension control, e.g., zero current on line I (see FIG. 4) when the damper is commanded to have full damping, then a signal is sent through line 234 to an instrument panel warning light (not shown) to notify the vehicle operator.

Another optional feature that may be implemented with this invention is to command full damping at vehicle acceleration from a rest position to compensate for possible delays in receiving the speed signal that occur in some systems. This command can be triggered by change in throttle position, gear shift to drive, vehicle door closing, or any parameter which indicates the vehicle might launch. Once the speed signal is sensed, damping is controlled as described above. A signal from the brake pedal can be used to indicate vehicle braking without computational delays, and in response, command full damping.

Figure 11:
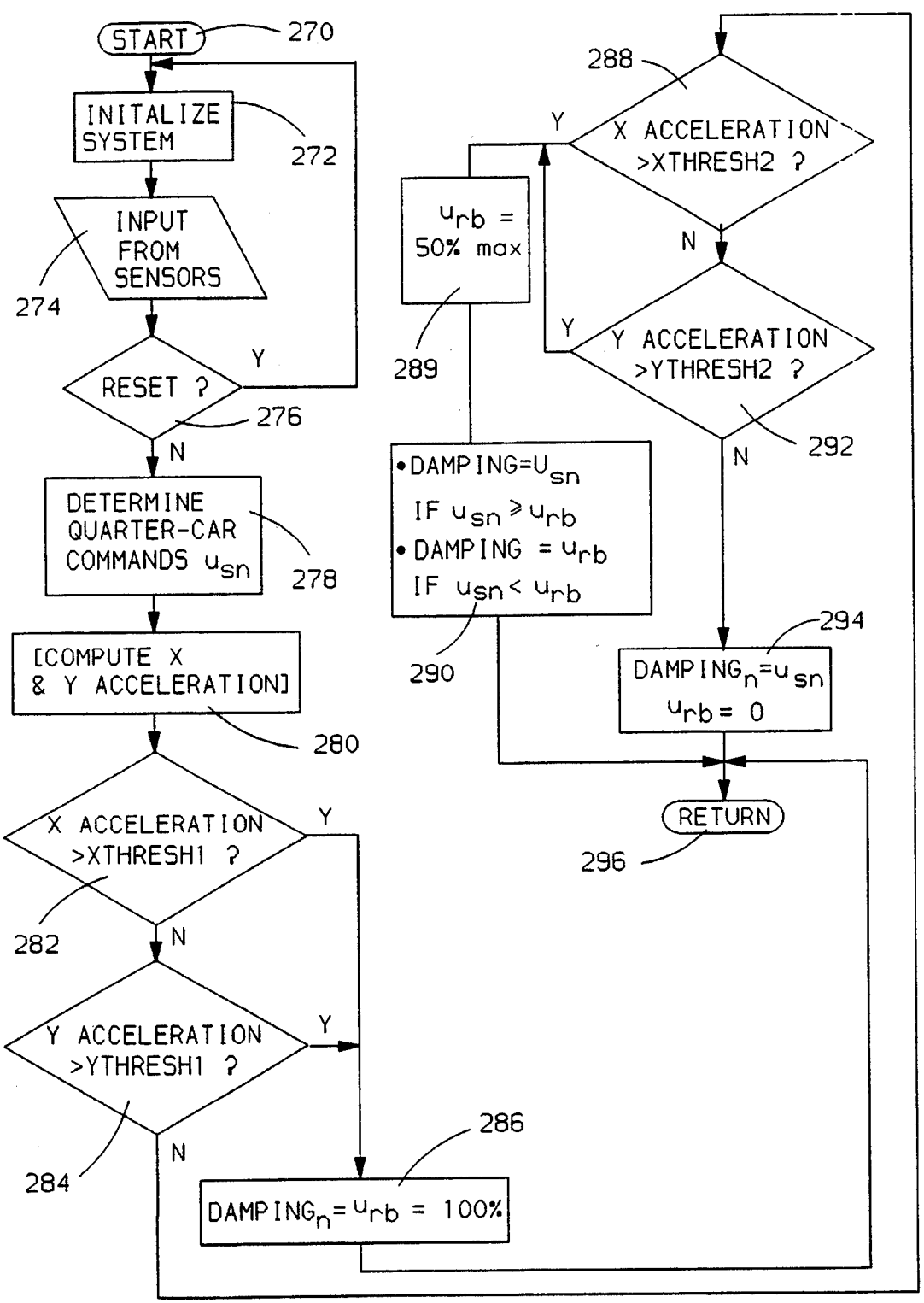
FIG. 11 is a flow diagram of one implementation of the control method of this invention.

The flow diagram in FIG. 11 is one example of a computer implementation of this invention. The routine starts at block 270 and initializes at block 272, including determining the at rest state of each quarter car suspension. Sensor data is received at block 274 and block 276 determines if the system needs to be reinitialized, e.g., if a door was just opened or closed. At block 278, each of the quarter car commands, $u_s$, is determined as described above. At block 280, forward and lateral accelerations are computed if necessary, e.g., if the center of gravity package is offset or if the vehicle speed and steering angle are used to determine forward and lateral acceleration.

Blocks 282 and 284 determine if forward or lateral acceleration is above a first threshold, e.g., 0.5G, if so, the semi-rigid body command, $u_{rb}$, and the force command, $u_{cn}$, controlling the force for each quarter car suspension, is set at block 286 to 100% of the maximum damping available. Blocks 288 and 292 compare forward and lateral acceleration to a second threshold, which is less than the first threshold, e.g., 0.3G. If the forward or lateral acceleration is greater than the second threshold, but not greater than the first threshold, then the semi-rigid body command, $u_{rb}$, is set at block 289 to, for example, 50% of the maximum available damping and, at block 290, the force command, $u_{cn}$, for each quarter car suspension is the greater of the quarter car command, $u_{sn}$, and the semi-rigid body command, $u_{rb}$. If neither the forward nor lateral accelerations is greater than the first or second thresholds, then the force command for each quarter car 180 is set, at block 294, equal to the quarter car command $u_{sn}$ determined for that quarter car, e.g., as described above, and $u_{rb}$ equals zero.

With the above implementation, this invention is used to improve the driving performance of a vehicle based, not only on the individual state of each quarter car suspension, but on the effect of the whole suspended body of the vehicle. Furthermore, the control of this invention, as set forth in FIGS. 9–11, may be implemented into a suspension system with a variable force actuator different from actuator 22a, above.

Figure 12:
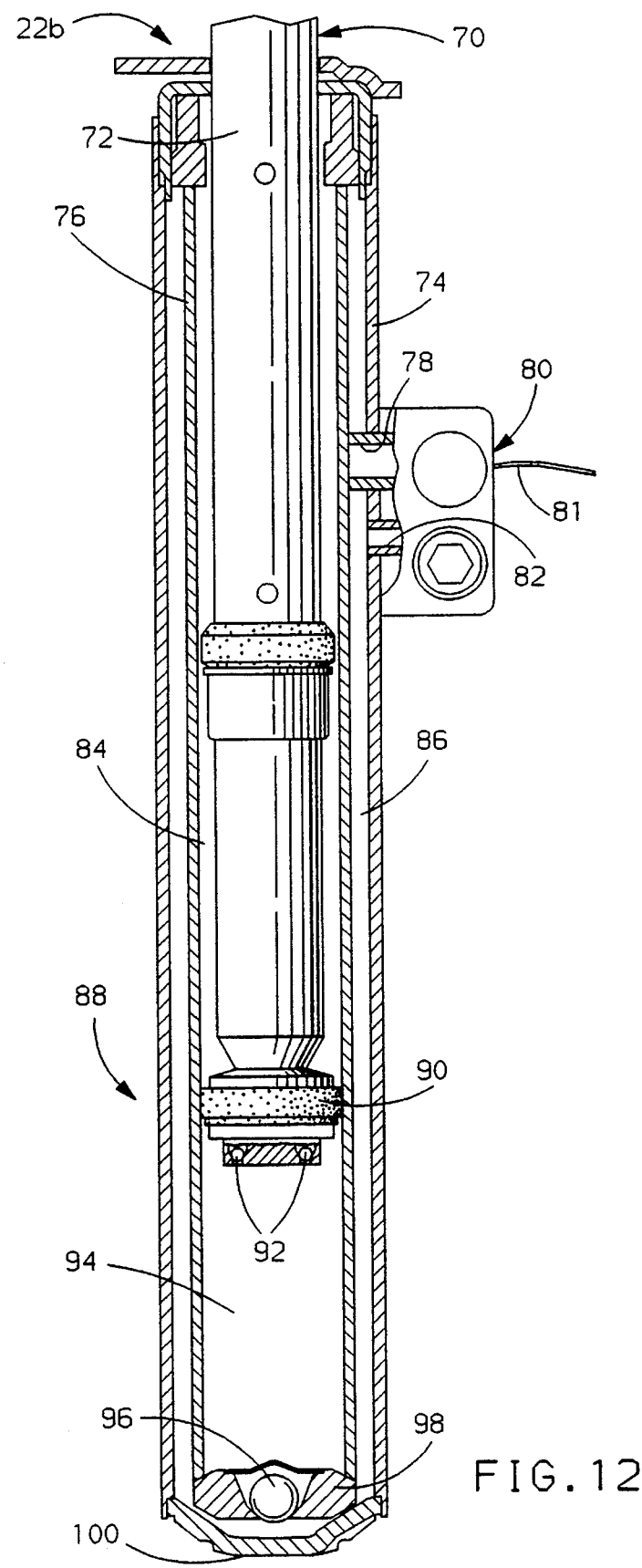
FIG. 12 is a diagram of a hydraulic variable force actuator for use with this invention.

An example of a continuously variable hydraulic shock absorber for suspension systems in which this invention may be implemented to control is designated by reference numeral 22b in FIG. 12. Shock absorber 22b is described in detail in U.S. Pat. No. 4,902,034 to Maguran et al., assigned to the assignee of this invention, and hereby incorporated into this specification by reference. Certain portions of Maguran et al. are also set forth below.

Shock absorber 22b comprises a first shock member 70 comprising a rod 72 with an enlarged diameter piston 90 within a cylinder tube 76 which is part of a shock member 88. Piston 90 is sealingly but slidably engaged with the inner surface of cylinder tube 76 so as to divide it into a first pumping chamber 84 above piston 90 and a second pumping chamber 94 below piston 90. Chambers 84 and 94 are filled with an incompressible fluid; and piston 90 includes one way check valves 92 which allow fluid flow from chamber 94 upward to chamber 84 as piston 90 moves downward but no flow from chamber 84 downward to chamber 94 as piston 90 moves upward.

Shock member 88 further comprises a reservoir tube 74 which surrounds cylinder tube 76 coaxially and defines, with cylinder tube 76, a reservoir chamber 86, which is partially filled with the incompressible fluid. Reservoir chamber 86 extends across the bottom of the unit between a lower end cap 100 which closes reservoir tube 74 and a base valve assembly 98 which closes cylinder tube 76 and includes a one way check valve 96 which allows fluid flow from reservoir chamber 86 into chamber 94 but not vice versa. An electrically controlled valve 80 allows and controls fluid flow from chamber 84 through passage 78, valve 80 and a passage 82 to reservoir chamber 86.

Shock member 70 is attached either to a rubber bushing 18 (FIG. 1) or to the sprung mass 12. Shock member 88 is attached to the unsprung mass 24.

A signal on line 81, either a direct current signal or a pulsed signal modulated to affect an average current, controls valve 80, which controls the fluid flow, thereby controlling force on the suspension system exerted by the shock absorber. A detailed description of the valve 80 is set forth in U.S. Pat. No. 4,902,034 and will not be set forth here. The valve 80 controls fluid flow so that the damping force on the suspension system is proportional to the current on line 81, and independent of rattle space velocity. This allows for direct control of damping force. If it is desired that the suspension system have damping force proportional to rattle space velocity, the signal on line 81 may be controlled to vary with rattle space velocity so that damping force increases with rattle space velocity in the manner of a conventional passive shock absorber. Alternatively, valve 80 may be replaced by an adjustable valve in which fluid back-pressure is dependent upon rattle space velocity.

Actuator 22b may be easily implemented with the control schemes of this invention. With a hydraulic damper such as actuator 22b, inertia can be ignored in the system model. In a model for a hydraulic damper, elements of matrix A are as follows:

$a_1 = -k_s/M_s$, $a_2 = -b/M_s$, $a_3 = -k_s/M_s$, $a_4 = b_p/M_s$, $a_5 = k_s/M_u$, $a_6 = b/M_u$, $a_7 = -(k_s + k_u)/M_u$ and $a_8 = -b_p/M_u$, where $b_p$ is the passive damping force on the system, e.g., when the flow valves are completely open. The elements of matrix B are as follows: $b_1 = 1/M_s$ and $b_2 = 1/M_u$. The matrix C is as described above.

If the valve 80 controls damping force independent of rattle space velocity, then the damping force control signal $u_s$ as controlled by block 200 (FIG. 5) is:

$$u_s = \begin{cases} 0, & B^T P X^e \leq \epsilon_d \\ -(B^T P X^e)\rho'/B^T P X^e, & B^T P X^e \geq \epsilon, \\ -((B^T P X^e - \epsilon_d)\rho'/(\epsilon - \epsilon_d), & \epsilon_d < B^T P X^e < \epsilon \end{cases}$$

where $\rho'$ is the maximum damping force, regardless of rattle space velocity. In actuality, when the valve 80 is wide open ($u_s$-0), there may be some natural damping caused by the fluid flow which is dependent upon rattle space velocity. This damping, however, may be slight and nevertheless converges to zero with rattle space velocity. This damping may be included in the model, i.e., as $b_p$ or part of $b_p$.

If valve 80 is the type in which fluid pressure is dependent upon rattle space velocity, then the damping control signal, $u_s$, and damping force, u, follow the same pattern as for actuator 22a (FIG. 3).

Implementation of actuator 22b into an integrated vehicle control system is similar to the implementation described above with reference to FIG. 7. With the hydraulic shock absorber, the preferred implementation of a means to measure the relative system state for each quarter car suspension system is to use LVDTs because the rotary signals of the electromechanical actuator 22a on lines A, B, and C (FIG. 4) are not as readily available.

For yet another implementation, hydraulic dampers which are controllable between discrete states, e.g., minimum damping and maximum damping, are well known and readily available to those skilled in the art. Hydraulic dampers with discrete states exert a damping force in relation to rattle space velocity. The higher the rattle space velocity, the greater the damping force. Adjustment of the flow control valve between multiple positions alters the damping between discrete levels of damping for a given rattle space velocity.

Figure 13:
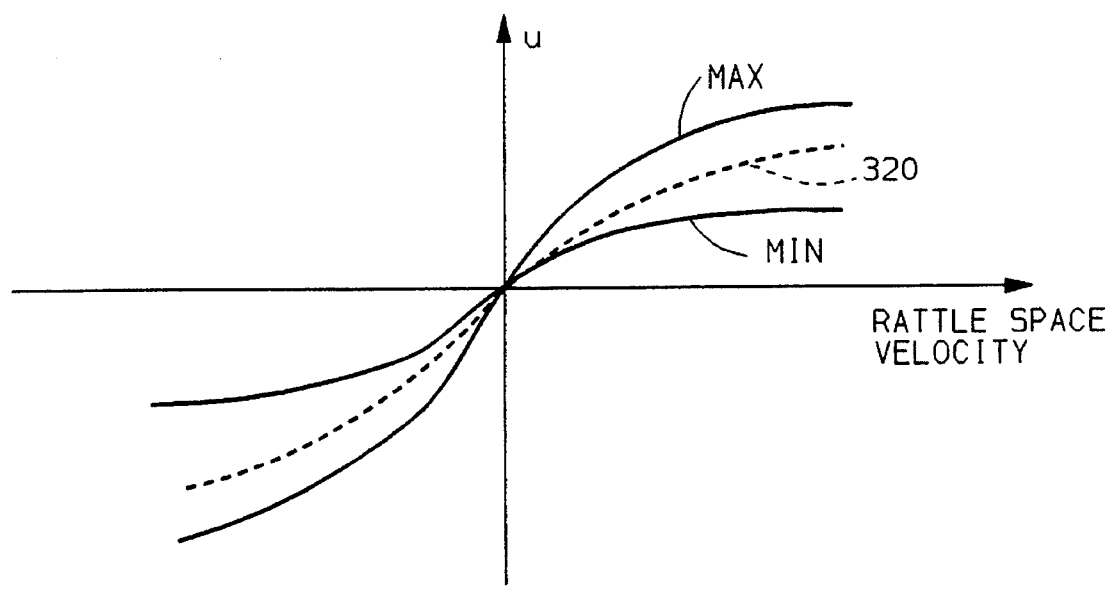
FIG. 13 is a damping force diagram of a two state hydraulic damper.

In implementation with such hydraulic dampers, a slight modification to the controller 200 (FIG. 5) needs to be made. FIG. 13 shows a graph of typical the minimum and maximum damping force characteristics of a two state hydraulic shock absorber, line MIN representing the minimum damping force and line MAX representing the maximum damping force. Dotted line 320 represents a threshold force, above which the damping command signals maximum damping and below which the damping command signals minimum damping.

Figure 14:
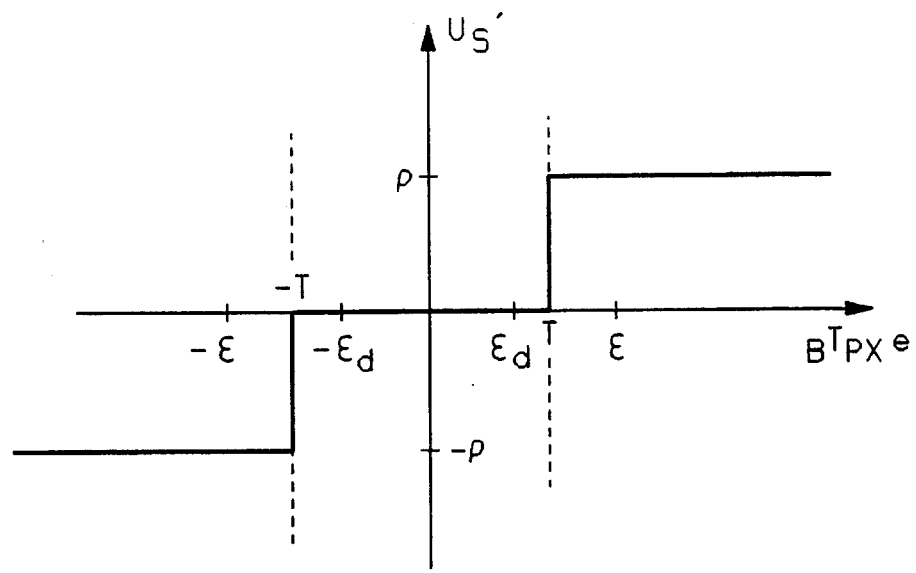
FIG. 14 is a graph of the output characteristics of the controller of FIG. 5 when used with a two state hydraulic damper.

Implementation to the controller can be easily understood with reference to FIG. 14. Threshold levels T and –T, corresponding to the line 320 of FIG. 13 and which may be a function of rattle space velocity, are located between $\epsilon_d$ and $\epsilon$, and between $-\epsilon$ and $-\epsilon_d$, respectively. When $B^T P X^e(k)$ is between –T and T, minimum damping is commanded. When $B^T P X^e(k)$ is greater than T or less than –T, maximum damping is commanded. The two state hydraulic shock absorbers can be implemented into the integrated control system of this invention with the above modifications. Three or more state hydraulic shock absorbers can also be implemented, providing a stepped progression between minimum and maximum damping, which is easily accomplished by one skilled in the art similarly to in the two state case.

The example implementations of this invention set forth above are the preferred implementations and are not limiting on this invention. For example, as understood by those skilled in the art, any controllable variable force damper may be used as damper 22. Additionally, the quarter car command, $u_{an}$, determined at block 278, FIG. 10, may be determined by any suitable means or method and need not be determined in response to observer 195 and controller 200. A simple method of determining the quarter car command may be to determine the command directly in proportion to rattle space velocity. Although this simple example is not preferred, it is set forth to illustrate that any means for determining the quarter command is encompassed by this invention, not just the preferred control method of FIG. 5. If the method of FIG. 5 is implemented, the hardware need not appear as in FIG. 10, as any hardware capable of performing the functions required by this invention are suitable, e.g., a single microprocessor implementation.

Various other improvements and modifications of this invention, in addition to those set forth above, may occur to those skilled in the art and will fall within the scope of this invention as set forth below.

The embodiments of the invention in which an exclusive property or privilege is claimed are defined as follows:

1. A method of control for a vehicle suspension system comprising four quarter car suspensions and a suspended vehicle body, comprising the steps of:

developing a quarter car command associated to each quarter car suspension in response to a signal representative of a parameter of that quarter car;

developing a semi-rigid body command in response to a signal representative of a state of the suspended vehicle body; and developing, for each quarter car suspension, a force command controlling force between sprung and unsprung masses, the force command equal to the greater of the associated quarter car command and the semi-rigid body command.

2. The method of claim 1, wherein, for each quarter car suspension, the first step comprises the substeps of:

measuring a relative suspension system state, wherein the measurement of the relative suspension system state is the signal representative of a parameter of that quarter car;

estimating the entire suspension system state in response to the measured relative suspension system state;

and developing the quarter car command in response to the estimated system state.

3. The method of claim 1 wherein the signal representative of the state of the vehicle body comprises at least one of the group of signals comprising:

a signal representing a measure of lateral acceleration of the vehicle;

a signal representing a measure of longitudinal acceleration of the vehicle;

a signal representative of accelerator pedal depression;

a signal representative of brake pedal depression; and a signal representative of steering wheel angle.

4. The method of claim 3 wherein the group of signals also includes a signal representing the opening and closing of a vehicle door, whereby after a vehicle door is opened and closed, the semi-rigid body command commands full damping until a vehicle velocity signal is detected.

5. A controller for a vehicle suspension system with four quarter car suspensions and a suspended vehicle body, comprising:

means for developing a quarter car command associated to each quarter car suspension in response to a signal representative of a parameter of that quarter car;

means for developing a semi-rigid body command in response to a signal representative of a state of the suspended vehicle body; and means for developing, for each quarter car suspension, a force command controlling force between sprung and unsprung masses, the force command equal to the greater of the associated quarter car command and the semi-rigid body command.

6. The apparatus set forth in claim 5 wherein each quarter car suspension includes a variable force electromechanical actuator.

7. The apparatus set forth in claim 5 wherein each quarter car suspension includes a variable force hydraulic actuator.

8. A method of control for a vehicle suspension system comprising four quarter car suspensions and a suspended vehicle body, comprising the steps of:

measuring various suspended vehicle body parameters and suspension system parameters for each quarter car suspensions;

developing a quarter car command for each quarter car suspension in response to one of the measured parameters for that quarter car suspension;

determining forward acceleration of the vehicle;

determining lateral acceleration of the vehicle;

comparing the determined forward acceleration to a first forward acceleration threshold;

comparing the determined lateral acceleration to a first lateral acceleration threshold;

comparing the determined forward acceleration to a second forward acceleration threshold;

comparing the determined lateral acceleration to a second lateral acceleration threshold;

developing, for each quarter car suspension, a force command controlling force between sprung and unsprung masses, the force command equal (i) maximum damping if the determined forward acceleration is greater than the first forward acceleration threshold or the determined lateral acceleration is greater than the first lateral acceleration threshold, (ii) the greater of a predetermined damping level between minimum and maximum damping and damping commanded by the quarter car command if the determined forward acceleration is less than the first forward acceleration threshold and the determined lateral acceleration is less than the first lateral acceleration threshold and if the determined forward acceleration is greater than the second forward acceleration threshold or the determined lateral acceleration is greater than the second lateral acceleration threshold, or (iii) damping commanded by the quarter car command if the determined forward acceleration is less than the second forward acceleration threshold and the determined lateral acceleration is less than the second lateral acceleration threshold.

* * * * *